United States Patent
Elewitz et al.

(10) Patent No.: US 11,501,655 B2
(45) Date of Patent: Nov. 15, 2022

(54) AUTOMATED SKILL TAGGING, KNOWLEDGE GRAPH, AND CUSTOMIZED ASSESSMENT AND EXERCISE GENERATION

(71) Applicant: Pearson Education, Inc., Bloomington, MN (US)

(72) Inventors: Zachary Elewitz, Denver, CO (US); Juan Lin, Denver, CO (US); Shushan He, Centennial, CO (US); Victoria Kortan, Centennial, CO (US)

(73) Assignee: PEARSON EDUCATION, INC., Bloomington, MN (US)

( * ) Notice: Subject to any disclaimer, the term of this patent is extended or adjusted under 35 U.S.C. 154(b) by 219 days.

(21) Appl. No.: 16/930,067

(22) Filed: Jul. 15, 2020

(65) Prior Publication Data

US 2022/0020282 A1    Jan. 20, 2022

(51) Int. Cl.
| | |
|---|---|
| *G09B 7/04* | (2006.01) |
| *G06Q 50/20* | (2012.01) |
| *G06F 16/25* | (2019.01) |
| *G06F 16/22* | (2019.01) |
| *G06Q 10/06* | (2012.01) |
| *G09B 19/02* | (2006.01) |

(52) U.S. Cl.
CPC ........... *G09B 7/04* (2013.01); *G06F 16/2246* (2019.01); *G06F 16/252* (2019.01); *G06Q 10/06316* (2013.01); *G06Q 50/205* (2013.01); *G09B 19/025* (2013.01)

(58) Field of Classification Search
None
See application file for complete search history.

(56) References Cited

U.S. PATENT DOCUMENTS

| | | | | |
|---|---|---|---|---|
| 2006/0078863 A1* | 4/2006 | Coleman | ................. | G09B 7/02 434/322 |
| 2008/0313000 A1* | 12/2008 | Degeratu | ............. | G06Q 10/105 705/320 |
| 2014/0065596 A1* | 3/2014 | Sniedzins | ................ | G09B 5/00 434/362 |

(Continued)

FOREIGN PATENT DOCUMENTS

| | | |
|---|---|---|
| JP | 2009048098 A | 3/2009 |
| KR | 102075936 B1 | 3/2002 |

OTHER PUBLICATIONS

International Search Report and Written Opinion, International Application No. PCT/US2021/041611, dated Oct. 28, 2021.

*Primary Examiner* — Nathan Hillery
(74) *Attorney, Agent, or Firm* — Quarles & Brady LLP

(57) ABSTRACT

Systems and methods of the present invention provide for storing textbook data, a glossary, and problems within a database; identifying a problem's guided solution, and a keyword within the solution matching an entry within the glossary, from which a skill tag is associated. The disclosed system then automatically generates an assessment including an assessment problem associated with the skill. If an incorrect response is received for the assessment problem, the database is updated to associate a user that input the response with the assessment problem and a skill. The system then automatically generates a customized exercise assignment associated in the database with the skill.

20 Claims, 5 Drawing Sheets

(56) References Cited

U.S. PATENT DOCUMENTS

| | | | |
|---|---|---|---|
| 2014/0310037 A1* | 10/2014 | Griffin | G06Q 10/0631 705/7.12 |
| 2016/0124999 A1* | 5/2016 | González Brenes | G06F 16/213 707/803 |
| 2016/0125096 A1* | 5/2016 | Haverlock | G06F 16/90328 707/722 |
| 2016/0188707 A1* | 6/2016 | Allen | G06F 16/24578 707/722 |
| 2017/0034107 A1* | 2/2017 | Krishnaswamy | G06F 7/08 |
| 2017/0220327 A1* | 8/2017 | Allen | G06F 40/205 |
| 2017/0300463 A1* | 10/2017 | Bisaga, Jr. | G06F 16/93 |
| 2018/0130156 A1* | 5/2018 | Grau | G06Q 50/2057 |
| 2019/0066525 A1* | 2/2019 | Palau | G09B 5/00 |
| 2019/0079992 A1* | 3/2019 | Rho | G06F 16/285 |
| 2019/0087780 A1* | 3/2019 | Cerqueira | G06Q 10/101 |
| 2019/0114346 A1* | 4/2019 | Capps | G06F 16/24575 |
| 2019/0114937 A1* | 4/2019 | Capps | G06Q 10/0639 |
| 2019/0116093 A1* | 4/2019 | Capps | H04L 67/535 |
| 2019/0220547 A1* | 7/2019 | Chen | G06F 16/9024 |
| 2019/0272775 A1* | 9/2019 | Noble | G09B 5/12 |
| 2019/0304336 A1* | 10/2019 | Deland | G06F 40/205 |
| 2019/0340945 A1* | 11/2019 | Malhotra | G06N 3/084 |
| 2019/0372863 A1* | 12/2019 | Capps | H04L 67/306 |
| 2019/0392355 A1 | 12/2019 | O'Malley | |
| 2020/0005194 A1* | 1/2020 | Rao | G06F 16/40 |
| 2020/0364235 A1* | 11/2020 | Kannan | G06F 40/30 |
| 2021/0042300 A1* | 2/2021 | Hayes | G09B 5/00 |
| 2021/0082309 A1* | 3/2021 | Rosenberg | G09B 19/0053 |
| 2021/0157617 A1* | 5/2021 | Vijil | G06F 16/90332 |
| 2021/0192421 A1* | 6/2021 | Raghavan | G06F 16/337 |

\* cited by examiner

AUTOMATED SKILL TAGGING, KNOWLEDGE GRAPH, AND CUSTOMIZED ASSESSMENT AND EXERCISE GENERATION

FIELD OF THE INVENTION

This disclosure relates to the field of systems and methods configured to generate algorithm-based questions (e.g., math, chemistry, or physics problems), and specifically relates to the automated generation of skill or learning objective-related tags associated with each problem, as well as a knowledge graph that defines a relationship between skills and problems, such as defining a first problem as a prerequisite to a second problem, based on the skills reflected within the tags.

SUMMARY OF THE INVENTION

The present invention provides systems and methods comprising one or more server hardware computing devices or client hardware computing devices, communicatively coupled to a network, and each comprising at least one processor executing specific computer-executable instructions within a memory that, when executed, cause the system to: store, within a database, an electronic textbook data (including a glossary associated with the electronic textbook data), and a plurality of problems extracted from the electronic textbook data. The instructions then cause the server to identify, within the electronic textbook data, a guided solution to a problem in the plurality of problems, and further identify, within the guided solution to the problem, a keyword. In response to a determination that the keyword matches an entry in the glossary, the server automatically generates a tag associated with, and defining a skill associated with, the problem. The instructions then cause the system to automatically generate an assessment comprising an assessment problem, selected from the plurality of problems and associated with the skill. In response to receiving an incorrect response to the assessment problem, the server then updates the database to associate a user identification (associated in the database with a user that input the incorrect response) and the skill. The server does not select any subsequent problems tagged with the skill from the plurality of problems for the assessment. The server then automatically generates a customized exercise assignment, comprising an exercise problem selected from the plurality of problems and associated in the database with the skill.

The above features and advantages of the present invention will be better understood from the following detailed description taken in conjunction with the accompanying drawings.

DETAILED DESCRIPTION

Figure 1:
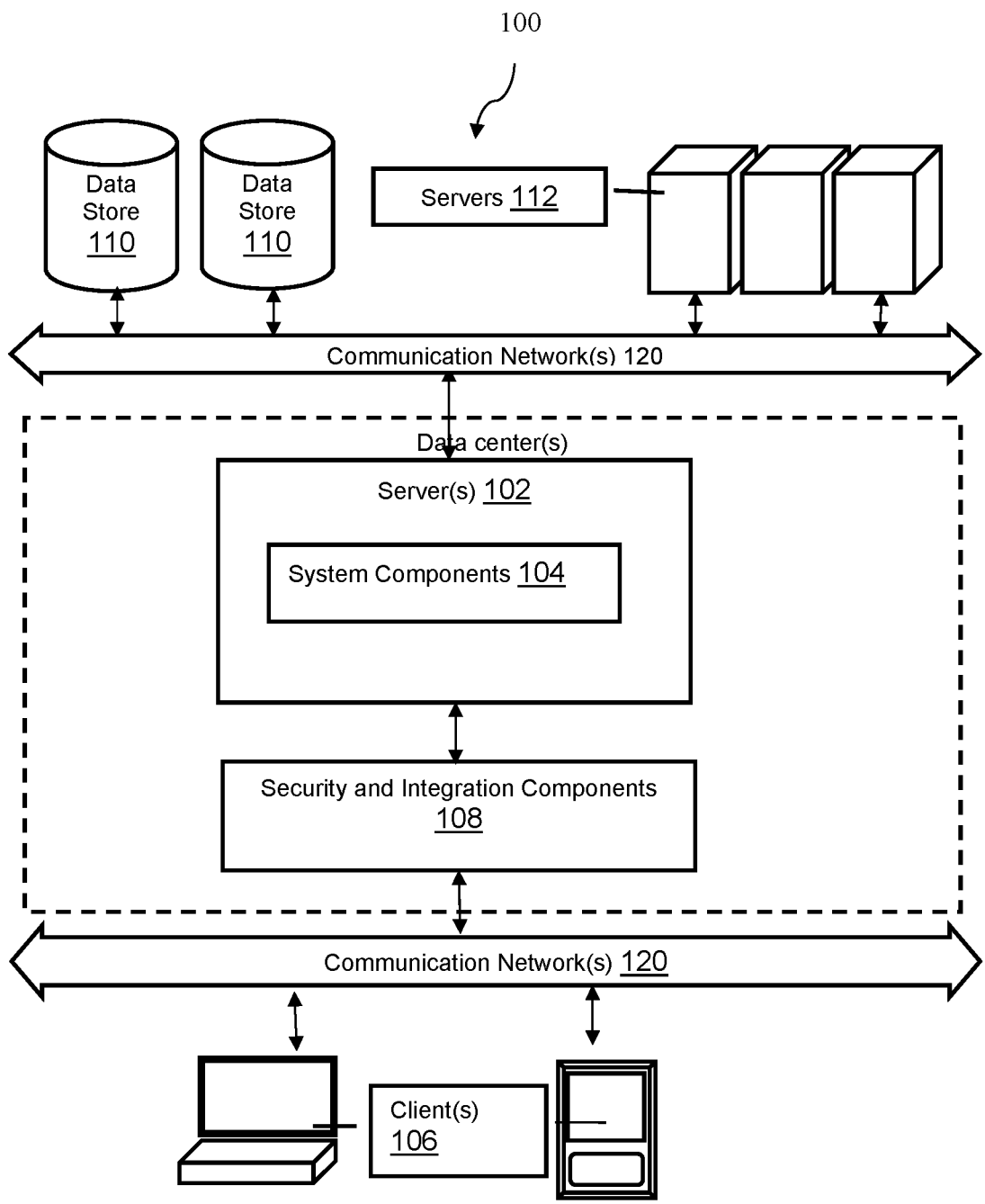
FIG. 1 illustrates a system-level block diagram demonstrating network components for automated skill tagging, knowledge graph, and customized assessment and exercise generation.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

The disclosed embodiments include textbook data (e.g., textbook data derived from a physical or electronic textbook), which further includes algorithm-based questions (referred to as problems herein; e.g., math problems, chemistry problems, physics problems, etc.), which include a series of steps required to complete each problem. In order to identify the skills needed to generate a solution for the problem, or to identify the steps completed to solve the problem, each problem (or steps within the problem) may be associated with a tag (e.g., metadata, related field in a database, etc.). In some embodiments, an administrator or other individual may use the tags they have identified to construct a knowledge graph, defining relationships between the concepts, steps, skills and/or problems identified, which may further identify the concepts or skills that must be mastered as prerequisites in order to solve a first problem, before proceeding to a subsequent second problem, which applies the skills from the first problem, and introduces additional skills needed to solve the second problem.

The process for such tag and knowledge graph generation is very time-intensive, resulting in significant expenses. Subject Matter Experts (SMEs) must manually review significant amounts of material and related problems in order to identify concepts, skills or learning objectives, to tag each individual problem with a skill or learning objective, and/or to create a knowledge graph reflecting relationships between the skills identified.

Additionally, the results of the SMEs' efforts may require review and refinement, and possibly adjustments to make the result capable of adaptation before it is considered a final product. However, in the current state of the art, even if such tags and knowledge graphs exist, SMEs must manually read and analyze voluminous amounts of material, identify problems within the material and analyze them, and manually generate the tags and knowledge graphs based on their research and effort.

For example, if an adaptive product wants to provide users with a problem about a particular concept, SMEs must review the problem in order to determine the concept, skill and/or learning objective associated with the problem and to properly tag the problem with the required skills. The SME must then create a knowledge graph, based on an evaluation of the user's skills, which defines a first problem as a prerequisite problem, in order to identify a subsequent relevant problem.

In order to reduce the required cost and time, and in order to improve the quality of this process, what is needed in the art is an automated version of the process described above. The disclosed embodiments accomplish this by providing a number of different approaches for automating skill tagging for problems, and the generation of knowledge graphs, user-customized assessments and user-customized exercises.

The disclosed embodiments include an automated skill tagging process. This automated process analyzes a resource, such as an electronic textbook or its associated data, in order to identify problems within the content of the resource, and further analyze the content to determine skills or learning objectives associated with each problem in the resource. The automated process may then generate one or more tags, such as associated metadata and/or an associated data field in a database (as non-limiting examples), which associate the problem with the one or more skill-based tags.

This approach may provide a distinct improvement over manual creation in that it can leverage pre-created content, and automatically generate tags from this pre-created content, rather than paying one or more SMEs to generate their own concepts, skills, learning objectives, tags, knowledge graphs, etc. Furthermore, by automatically generating the tags for each problem from the pre-created content, any problems used to assess the student's skills or provide problems for assignments in order to improve performance of the student's learning objectives (described below) will better represent the problems in the original content.

The disclosed embodiments further include the automated generation of a knowledge graph, using the automatically generated tags for problems described above. This automated process defines the relationships between the concepts, problems, steps, skills, learning objectives, and/or other problems represented in the knowledge graph. An example of such a relationship may be a relationship determined from one or more skill tags associated with a first problem, which establish the one or more skills as prerequisites that must be mastered by a student before progressing to a second problem, which has been associated with one or more skill tags and/or learning objectives that the student needs to master.

Such an automated knowledge graph (e.g., a collection of pre- and post-requisite relationships) represents a significant improvement in the state of the art. As a first example, automating a knowledge graph, as opposed to creating it manually, represents a much more efficient option, as the speed by which the knowledge graph may be created may be significantly increased.

In an additional example, such a knowledge graph would improve products, solutions, and/or platforms by allowing them to be extensible to additional use cases, which would, in turn, make them more adaptive. Making these products, solutions, and/or platforms more adaptable would further provide opportunities to include the knowledge graph within new or additional products or services, allowing an organization to offer additional products including this feature.

The disclosed embodiments further include the automated generation of problems, to be used in an assessment to determine the student's skills, and/or to be used within one or more assignments that focus on skills on which the student performed poorly during the assessment, in order to improve the student's mastery of the learning objectives within the assignment. The disclosed embodiments may determine the skills associated with poor performance, and generate assignments, based on the automatically generated skill tags and the knowledge graph, as described below.

The automatically generated and adaptive assessment and assignment represent an improvement in the state of the art, in that they may be used within a product designed to curate a student's online experience in developmental math and guide them to problems for homework that will best advance their knowledge (i.e., gives curated content that matches relevant content/concepts and the book problems, so that the students' time is best spent). The automated processes described above represent a significant savings in SMEs' and students' time, and as a result, a significant savings financially, as well as producing a result that is specifically curated to the homework problems, and can produce multiple tags per problem.

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users, As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

Figure 2:
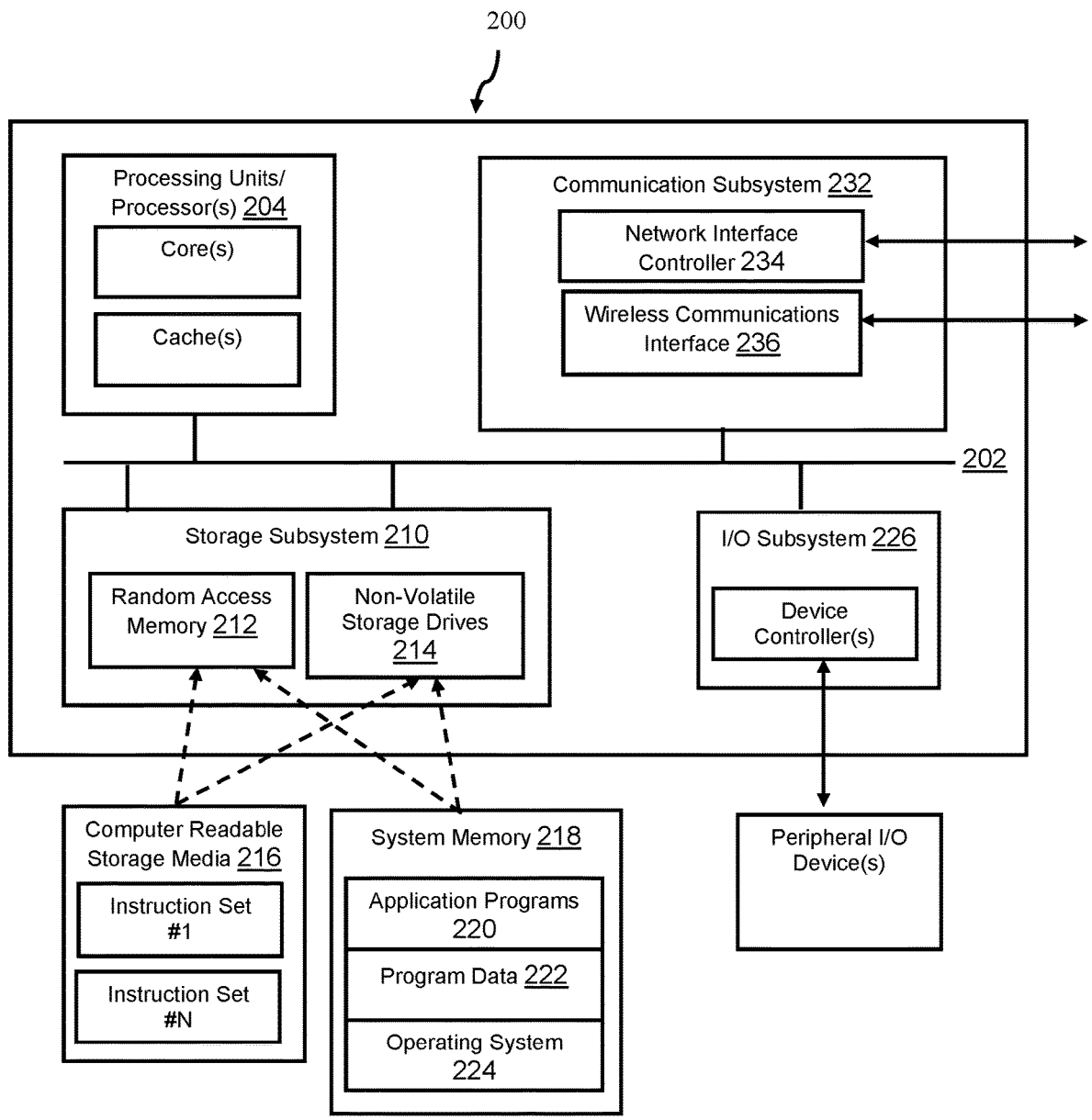
FIG. 2 illustrates a system-level block diagram demonstrating server components for automated skill tagging, knowledge graph, and customized assessment and exercise generation.
Figure 3:
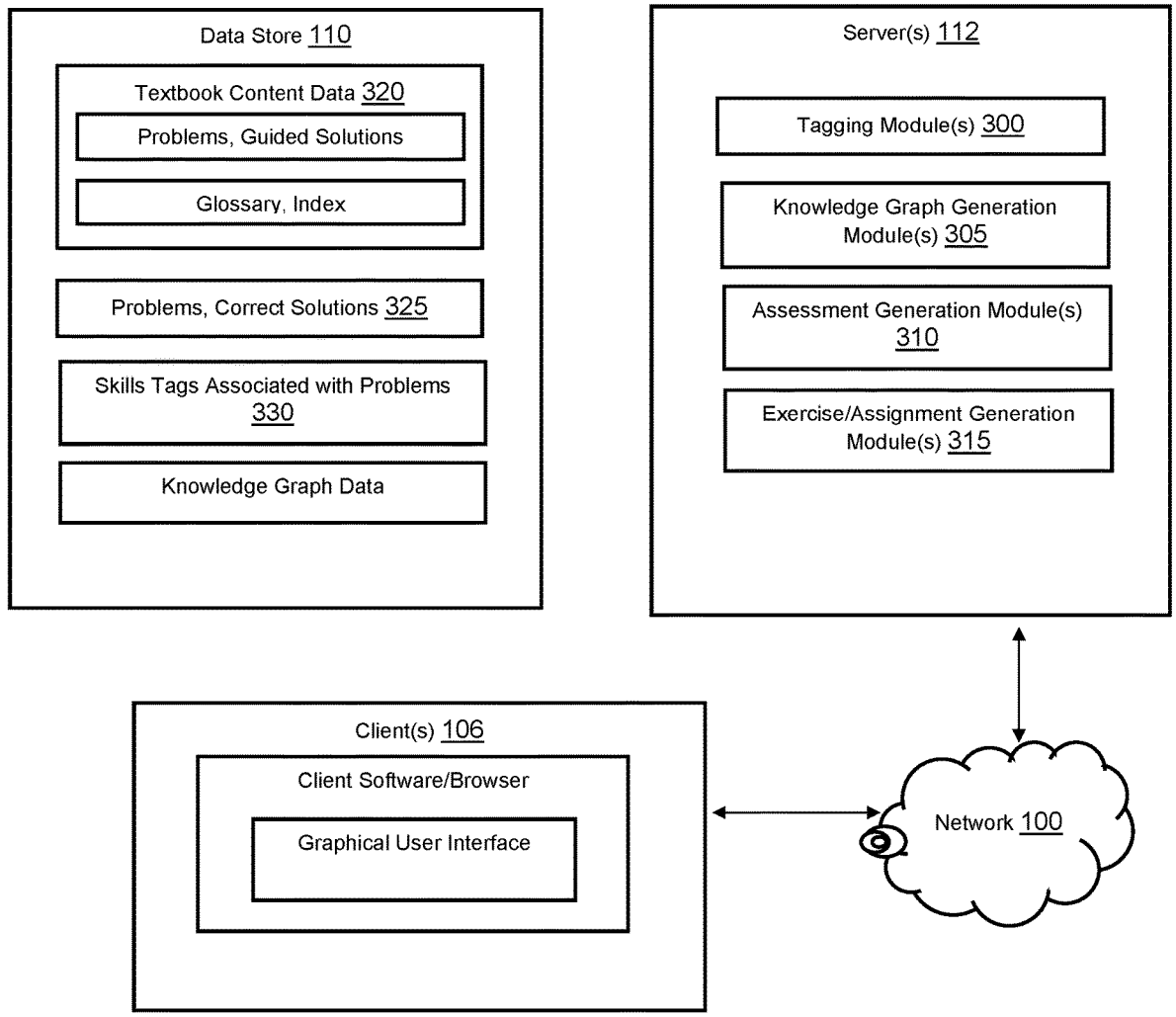
FIG. 3 illustrates a system-level block diagram demonstrating server, client, and data store components for automated skill tagging, knowledge graph, and customized assessment and exercise generation.

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

The various physical components of the communications subsystem 232 may be detachable components coupled to the computer system 200 via a computer network, a Fire-Wire® bus, or the like, and/or may be physically integrated onto a motherboard of the computer system 200. Communications subsystem 232 also may be implemented in whole or in part by software.

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments. It should be noted that the embodiments shown in FIGS. 1-2 are examples of a distributed computing systems and are therefore not intended to be limiting.

In the interest of simplicity, it should be noted that references to server 112 may refer specifically to server 112, but may further refer to any combination of devices or software instructions disclosed herein. As a non-limiting example, method steps described as being executed by server 112 may include any method steps executed by any combination of software running on server 112, a collection of servers 112 (i.e., a server farm), and/or on client(s) 106.

Similarly, references to the method steps performed by server 112 or "the disclosed system" may include software logic or instructions executed by server(s) 112 or client(s) 106, wherein, as described below: one or more tagging modules 300 are configured to automatically tag problems with skills; one or more knowledge graph generation modules 305 are configured to automatically generate one or more knowledge graphs; one or more assessment generation modules 310 are configured to generate one or more customized assessments for users; one or more exercise/assignment generation modules 315 are configured to generate one or more customized assignments for students; and so on. In some embodiments, any combination of these software module may be configured to execute any of the method steps disclosed herein.

As noted above, the disclosed system may have access to one or more online resources, such as an electronic textbook, that include one or more concepts and one or more problems used to assess a user's skill and mastery of those concepts, and/or provide means for the user to improve those skills in order to accomplish specific-learning objectives.

As a non-limiting example, a system administrator, such as a teacher or web site developer, may create content for the resource, such as a learning course textbook, which may be accessible via an online portal. The content for the resource may include, as non-limiting examples, any combination of: concepts to be taught in the course; problems to be presented to each of the users, such as students enrolled in the course; fully worked example solutions to problems; guided solutions including steps that aid students through problems similar to those testing their skills, but which are not credit bearing; a glossary for the textbook defining the concepts, terms, etc.; an index for the textbook that references where specific terms, concepts, problems, and/or skills are found in the textbook, etc. In some embodiments, the content described above may be scanned from a physical textbook. The received content may then be analyzed, categorized (if needed), and stored in association within data store 110, possibly as textbook content data 320.

Server 112 may then identify, within the input content, one or more problems found throughout the content, and store them within data store 110, along with correct solutions to the problems 325, which the system may further be configured to use in order to identify, within the processes below, one or more incorrect solutions to the problem.

Server 112 may be further configured to distinguish, within the identified problems 325, between problems for which a solution and/or a guided solution is provided, as well as problems that are not associated with a solution or guided solution, and store these solutions, an identifier for the solutions (e.g., unique identifier, identifier as a problem without a solution, with a solution and/or with or without a guided solution, etc.) the correct answers to the solutions, if applicable, and so forth.

For problems that are identified as problems with a guided solution, server 112 may be configured to identify "steps" within each guided solution to each problem 325. In the disclosed embodiments, a step may be a line of text given within a guided solution to a problem 325.

In some embodiments, server 112 may be configured to remove one or more unnecessary elements from the problem. Specifically, server 112 may be configured to analyze the text of each individual step, and identify remnants of details of how equations should look when displayed on a screen, but which are not useful for the purpose of skill tagging. Server 112 may then remove these remnants, leaving only the information required for skill tagging. As a non-limiting example, as the disclosed system transforms the format of the text received during the capture of the text data, additional characters or meaningless words may be included with the captured text. These additional characters or meaningless words may be removed as extraneous information.

Server 112 may then parse through each step, or in some embodiments, the entire problem. In some embodiments, this parsing may include identifying, within each step, and/or within the problem as a whole, one or more tokens or terms within the step and/or problem. Server 112 may select a subset of the tokens or terms for matching purposes, described below. In some embodiments, the parsing step may include removal of "stop words," such as a, an, or, the, etc., or may be reduced according to punctuation, so that the system is able to analyze shorter phrases when identifying keywords.

After parsing over the text of the problems, or the steps within the problems, within the content, server 112 may compare each of the individual tokens or terms, or the subset of tokens or terms, against a glossary of terms within the textbook content data 320. Server 112 may do this in order to identify a similarity (e.g., matching characters beyond a threshold) between the token(s)/term(s) and the terms listed in the glossary of terms, which have previously been curated to match the problems in the textbook.

The collection of terms in the glossary may be of particular value, since they have already been curated to match the problems in the book. In this context, each term taken from the glossary of terms within the textbook may be considered a skill. However, a skill may also be more generally defined as a mastery of the concepts one needs to understand to generate a solution to a problem (e.g., product rule, power rule, integration by parts, etc.). The comparison of parsed tokens or terms with the terms in the glossary may be used in the automated skill tagging process.

A significant improvement of the disclosed embodiments, when compared with existing solutions, is that multiple skill tags may be associated with each problem, or steps within any given problem, rather than limiting the problem to a single skill tag. In other words, rather than tagging problems with one skill or learning objective, the disclosed embodiments may tag problems with multiple skills or learning objectives, in order to learn more about a student's knowledge with a fewer number of problems, since each problem will give more information about what a student knows or doesn't know. The problems presented to the student thereby provide problems with more granular skill or learning objective tags.

Put another way, by increasing the number of tags associated with each problem, the disclosed system is able to more quickly determine, based on performance on an assessment (i.e., determine using a fewer number of assessment problems), the skills and learning objectives that the user struggles with the most, in order to provide targeted problems (e.g., within customized assignments) that will improve performance for the user's learning objectives, described in more detail below.

However, the disclosed system is also configured to eliminate redundancies of tags, so that problems are not overloaded with tags that are no more than variations of an existing tag for the problem. The disclosed system may therefore include a text similarity comparison to identify those terms within the glossary that are only variations of the term/token parsed from the problem, so that variants of the same skill will all be tagged the same. For example, multiplication, multiply, and multiplied may all be included in the same tag, and may represent the same skill, even though they all use different letters.

In some embodiments, in order to identify similar text within the entries in the glossary, the disclosed system may determine the length, in characters, of each skill in the glossary, and further determine the Jaro-Winkler similarity of that skill versus every contiguous subset of the steps for the problem of the same number of words. Jaro-Winkler is one of multiple similarity comparison metrics, used in computer science or statistics contexts, which may be used in the disclosed embodiments. In these embodiments, a problem is tagged with the skill if there is a subset of a step that has a Jaro-Winkler similarity above a pre-determined threshold. As a non-limiting example, embodiments which use the Jaro-Winkler metric may determine the string metric for the Jaro-Winkler distance by measuring an edit distance between two sequences. The lower the Jaro-Winkler distance for two strings, the greater similarity there is between the two strings. Each character in a first string may be compared with all its matching characters in a second string, considering any transposition of characters between the two strings.

This threshold may be defined in data store 110, or within the software instructions or other logic within the software running in the disclosed system. The threshold can be adjusted depending upon the quality, quantity, and/or volume of tags to be desired.

For each problem stored in data store 110, for each identified skill in the glossary that matches each term, token, and/or subset associated with the problem, server 112 may generate a tag, possibly comprising a metadata, data field, data record, etc. to be associated with the problem. In some embodiments, at least one skill tag is required to be associated with each problem 330, thereby allowing the system to determine the problem skills for each user of the system, based on correct or incorrect solutions to the problem, described in more detail below. The process of skill tagging may be repeated for all problems associated with the textbook content data 320.

Once skill tags have been associated with each problem 330, the tags may be stored, in association with their respective problem 325, in data store 110. These tagged problems may be used in order to create the knowledge graph that identifies the relationships between skills, as described below.

Once each of the guided problems is tagged with one or more skills derived from the terms matching entries within the glossary for each problem, server 112 may identify those problems in the textbook content data 320, which are associated with the guided problem. For each of these unguided problems associated with the guided problems, server 112 may generate and associate tags for the unguided problems matching the tags for the guided problems, and store these tags in association with each of the unguided problems in data store 110.

The guided and unguided problems may be used in both generating skills tags and/or in automatically generating a knowledge graph, described in more detail below. Although non-guided problems may be used to tag problems with specific skills, for the majority of automatically generated tags, the system may analyze guided problems that are associated with learning aids where the user has a fully worked problem, an example problem, and a guided solution, that details the steps of how to solve the problem. The disclosed system may then use these steps to automatically identify the associated concepts, and further identify these concepts as skills. By automatically generating the associated concepts and skills, the disclosed system avoids the loss of substantial steps identified within the analysis of the guided problems.

The generated skills tags may be further used in the automatic generation of a knowledge graph describing the relationships of the skills associated with the tags, with the problems themselves, and/or with steps used to solve the problems. A knowledge graph may comprise a directed acyclic graph, including automation processes built in a software coding or scripting language, such as Python. As a non-limiting example, this acyclic graph may comprise a graph with a tree structure, made up of nodes that represent each of the skills used for the problems (or skills used within the steps of the problems) stored in data store 110. Each of these nodes may, in turn, further be associated with one or more skill and/or learning objective tags stored in association with the problems.

The tree structure may further include one or more edges connecting the nodes. In some embodiments, the edges may represent relationships between the skills and/or learning objectives. The combination of nodes and edges may create a "tree" graph structure, where additional nodes and edges are connected to each node.

Regardless of the graph structure, the knowledge graph may identify the relationships between which skills a user has mastered and/or knows and the learning objectives which they haven't mastered and/or don't know (e.g., the user can't understand multiplication or the distributive property without addition, etc.). The knowledge graph may therefore include problems, or steps of problems, tagged with skills and/or learning objectives, and may show the relationship between these skills and/or learning objectives. For example, the knowledge graph may identify and represent the relationships between skills needed for a user to understand algebra, chemistry, physics, etc. The relationships may further identify prerequisite or post-requisite relationships between the concepts, problems, steps, skills, and/or learning objectives, which allow the disclosed system to be adaptive.

As a non-limiting example of the adaptive nature of the disclosed system, an assessment may be provided to users at the beginning of an academic term in order to determine their comprehensive skills in math. The system may provide an assessment problem that tests skills related to multiplication. Based on the user's response to the provided problem, the disclosed system may determine that the student does not understand multiplication, and will therefore not provide additional multiplication problems. In addition, the system may determine that the user will not be able to understand or solve problems that depend on multiplication, or in other words, that are "downstream" from multiplication.

Additionally, as described herein, multiple tags may be associated with each problem, providing the optimal amount of information the system needs to determine what concepts and skills a student understands and does not understand. In this way, the disclosed system is able to adapt to the user's responses, and provide a comprehensive assessment of the user's skills using a minimal amount of user input.

Server 112 may be further configured to automatically generate the knowledge graph, once the problems in data store 110 (which will be presented to the student to prompt a solution, described below) have been tagged to reflect associations with concepts (e.g., product rule, power rule, integration by parts), skills, learning objectives, etc. that a student presented with the problem needs to understand to formulate a solution to the problem. In order for server 112 to automatically generate the knowledge graph, the software logic may first determine, based on the associated tags, what each problem is about (i.e., what skills it is associated with), so that the automatic generation of problems presented to the user in the assessment and assignments described below, are customized to each student.

The disclosed embodiments may include several different approaches to create a knowledge graph: In a first, step level approach, server 112 may construct a knowledge graph of prerequisites and post-requisites based on the steps of one or more problems within the textbook content that include a guided solution to the problem. Using this approach, server 112 may identify, within the content of the textbook or the data generated from the content within the textbook, a problem, and an example problem that has been worked out, as well as a guided solution that guides the user through the example problem so that they understand the steps and skills required to solve the problem, Server 112 may then analyze the order of the identified steps within the guided solution, as well as skills associate with those steps, to identify the order of skill prerequisites. In other words, a first step may be associated with a first skill, and the first skill may be a prerequisite skill to a second skill necessary to perform the second step, and so on.

Server 112 may then generate the knowledge graph according to the determined order of steps and which skills are prerequisites to other skills. For example, in a node and edge-based tree graph a first step or prerequisite skill may appear in a first node, which may be attached by an edge to one or more subsequent steps associated with skills for which the first skill is a prerequisite.

Steps or skills subsequent to the first step or skill may be considered post-requisites, which may include additional steps or skills needed to complete or otherwise clean up after the prerequisite steps have been completed.

Thus, the guided solution approach, described above, may be used to generate a knowledge graph according to repeated instances of steps are prerequisites to other steps. As non-limiting example, if a first step includes addition, a second step includes multiplication, and a subsequent step includes both the knowledge graph may be designed in such a way that these skills are prerequisites to one another.

In a second, equation subtree structure approach, server 112 may construct a knowledge graph of prerequisites and post-requisites based on equation tree structures from problems within the textbook content. About 60% of the problems from the textbook content may be tagged (possibly using the techniques described above) with mathematical equation skills that can be interpreted as tree-like structures indicating the mathematical operations that are required, as well as the order by which those operations are carried out, for the problem.

Server 112 may therefore be configured to identify, within the textbook content, one or more problems that may include mathematical equation skills, and tag the problems accordingly with mathematical equation skills.

Server 112 may then interpret the tagged problems in the context of an equation tree structure made up of essential ordered collections of binary mathematical operations, which indicate the required math operations to be carried out for the problem, as well as the order in which these required math operations are to be carried out.

Server 112 may further parse the equation tree structure into constituent subtrees, which may be smaller collections of operations contained in the original equation tree. Server 112 may then utilize the relationship between an equation tree and all of its subsequent subtrees to construct the knowledge graph of prerequisite and post-requisite skills based on the assumption that students need to master simpler sequence of operations before they will master the more complex ones.

In a third, index page number-based approach, server 112 may construct a knowledge graph of prerequisites and post-requisites based on page numbers associated with problems that test specific skills within a glossary and/or index. In this approach, each problem from the textbook is tagged with skills defined from the glossary of the textbook.

Server 112 may therefore access the glossary and/or an associated index, which identifies the page number on which the skill is introduced, and analyze the relative page numbers on which each concept associated with the skill or step is introduced.

Server 112 may then establish a relationship within the knowledge graph between the two skills associated with tags. In some embodiments, the relationship between these skills may be represented so that skills associated with particular problems may be prerequisites and/or post-requisites to subsequent problems, so that a skill introduced on an earlier page is a prerequisite, and the post-requisite skill is introduced on a later page. In some embodiments server 112 may establish a relationship within the knowledge graph between skills needed for steps within a particular skill, so that skills associated with specific steps may be prerequisites (earlier page) and post-requisites (later page) for subsequent steps, even though the same skill is tagged to the same problem.

In a fourth, exercise/assessment interaction-based approach, server 112 may construct a knowledge graph of prerequisites and post-requisites based on a history of user interactions that indicate how students traverse the skills within a group of problems within assessments or other exercises, such as homework assignments.

In these embodiments, each exercise and/or assessment that has previous interaction with users may be tagged with skills, possibly using the techniques described above. User interaction with problems within such exercises and/or assessments may be tracked and archived to determine how students have historically traversed the problems (i.e., in which order users have completed the problems and/or the steps for the problems).

Using this historical user interaction data, server 112 may generate the knowledge graph. Server 112 may analyze the relationships established by the order in which users completed problems, or steps for solving those problems, and determine that the skills associated with problems or steps that were completed first may be established as prerequisites to the skills associated with those problems or steps that were completed subsequently. Based on these relationships, server 112 may generate the knowledge graph, defining the earlier skills as prerequisites to the subsequent skills. As a non-limiting example, if a skill 'A' often shows up in a preceding exercise/assessment and skill 'B' shows up in the next exercise/assessment then the relationship A−>B is included in the knowledge graph.

In addition to generating the knowledge graph from previous assessments and/or exercises, the disclosed embodiments may also use the generated knowledge graph to determine the order in which problems are presented to users within assessments and exercises provided to users subsequent to the knowledge graph being generated.

Specifically, the disclosed embodiments may use the knowledge graph to generate an adaptive assessment that is customized to each user, to determine which skills the user has mastered, and which they have not. As each problem is presented to the user in this adaptive assessment, logic within the assessment software 310, in conjunction with the generated knowledge graph, may determine, according to a correct or incorrect response to the problem, whether the user has mastered the skill associated with that problem.

If the response was incorrect, the logic may determine that subsequent problems should not be associated with the skill associated with the tag, or with any problems associated with tags associated with skills for which the skill in the original problem is a prerequisite. The assessment may store (possibly in data store 110) a record of skills for which the user provided incorrect responses, and possibly the post-requisite skills, based on the knowledge graph.

As a non-limiting example, the adaptive assessment may be used to curate a student's online experience in developmental math and guide them to problems for homework that will best advance their knowledge, thereby giving the user a customized test experience.

To accomplish this, server 112 may access data store 110, and select, possibly using a database query, a first problem. In some embodiments, this problem may be selected by identifying the problem at the "root" of the tree structure, so that this problem is a prerequisite for all subsequent problems. Each subsequent problem may then be based on what is learned about the user based on their response to the problem.

For example, the user may provide user input comprising a response to the first problem. Server 112 may analyze the response, and determine whether it is a correct or an incorrect response, possibly by comparing it to a correct response in data store 110, and possibly by analyzing the steps taken by the user in providing the response.

If server 112 determines that the response is correct, server 112 may identify the skill associated with the tag for the problem, and determine that the user has mastered that skill. In some embodiments, the determination of whether the user has mastered the skill may be stored in data store 110, possibly within a data record associating the user, the skill, and the problem.

Server 112 may then identify a subsequent skill for which the first skill was a prerequisite, and select a problem tagged with this skill. Server 112 may then repeat this process with each subsequent problem until the assessment is complete.

If server 112 determines that the response is incorrect, server 112 may identify the tag associated with the problem for which the incorrect response was received, and determine that the skill represented in this tag has not been mastered by the user. Server may store the association between the user, the skill, the problem, and the incorrect response in data store 110, possibly as associated data fields in a data record.

In selecting a subsequent problem, server 112 may eliminate, as candidate problems, any problem that is associated with the identified skill. In other words, in selecting subsequent problems, server 112 may select problems which have been tagged with skills that are not associated with the skill tag from the incorrect response. Furthermore, server 112 may eliminate, as candidate problems, any problem that is identified in the knowledge graph as a skill for which the identified skill is a prerequisite. Thus, the subsequent problem a student is presented with is designed to provide as much data as available to determine the skills which the user has or has not mastered.

Using the data stored in association with the user's incorrect responses, server 112 may then generate one or more exercises, such as assignments, quizzes, etc. configured to recommend problems at the boundary of the individual student's knowledge so that the student makes the best use of time by not wasting it on skills they already know.

Server 112 may identify, within data store 110, possibly within a data record associating a user, an incorrect response, a concept, a problem and/or a skill, the skill for which the user provided an incorrect response. Server 112 may then select, from a pool of problems stored in data store 110, a problem that has been tagged with the same problem, but is not the problem previously solved by the user, and present that problem to the user.

Figure 4:
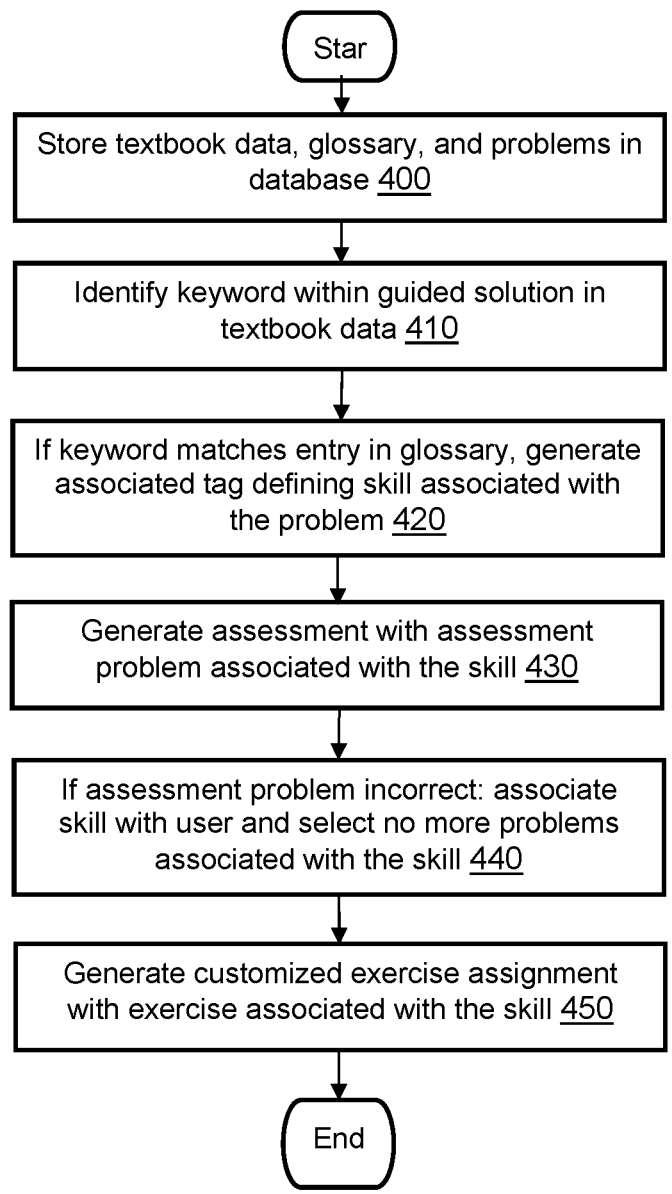
FIG. 4 illustrates a flowchart demonstrating example method steps for automated skill tagging and customized assessment and exercise generation.

Thus, as a non-limiting example, the disclosed system may include an adaptive product that provides a problem about a particular concept, and determines what the problem is about in order to recommend a relevant problem. In order to recommend a problem that involves a pre-requisite concept the problem currently being evaluated must be analyzed to determine what each problem is about in order to provide an appropriate subsequent problem to the user, in order to guide the user to problems for exercises/assignments that will best advance their knowledge In summary, FIG. 4 demonstrates a non-limiting example embodiment of the disclosed invention, which includes a database, and a server comprising a computing device coupled to a network and including at least one processor executing instructions within a memory. In Step 400, the database stores: an electronic textbook data, including a glossary associated with the electronic textbook data; and a plurality of problems extracted from the electronic textbook data.

In Step 410, the server identifies, within the electronic textbook data, a guided solution to a problem in the plurality of problems; then identifies within the guided solution to the problem, a keyword. In Step 420, responsive to a determination that the keyword matches an entry in the glossary, the server automatically generates a tag associated with, and defining a skill associated with, the problem.

In Step 430, the server automatically generates an assessment comprising an assessment problem, selected from the plurality of problems and associated with the skill. In Step 440, responsive to receiving an incorrect response to the assessment problem: the database is updated to associate a user identification, associated in the database with a user that input the incorrect response, and the skill. No subsequent problems tagged with the skill are selected from the plurality of problems for the assessment. In Step 450, the server additionally generates a customized exercise assignment, comprising an exercise problem selected from the plurality of problems and associated in the database with the skill.

Figure 5:
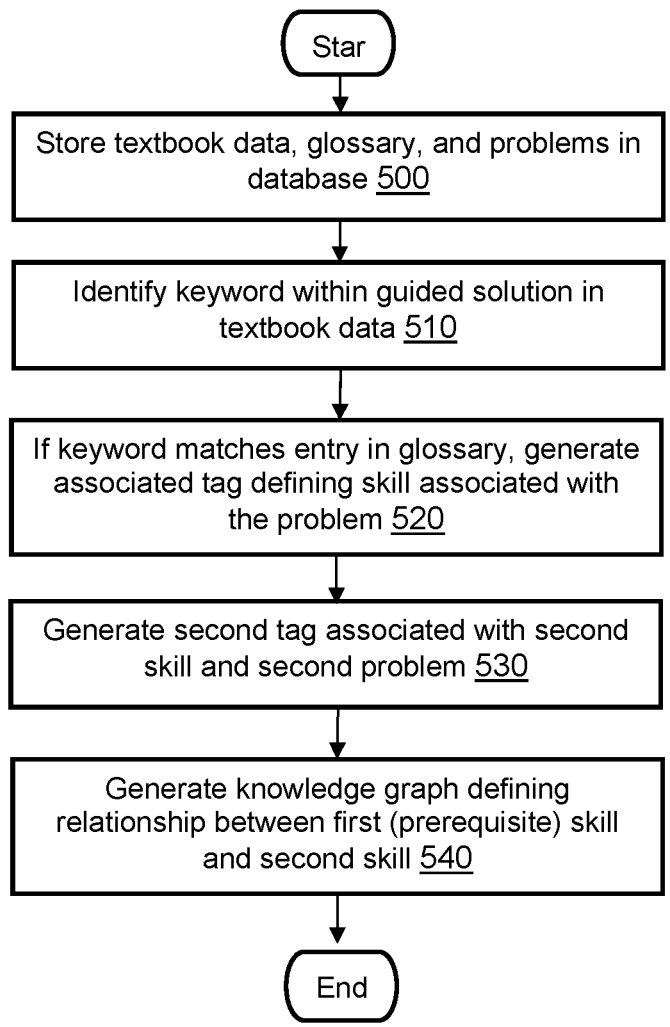
FIG. 5 illustrates a flowchart demonstrating example method steps for automated skill tagging, knowledge graph, and customized assessment and exercise generation.

FIG. 5 demonstrates a non-limiting example embodiment of the disclosed invention, which includes a database, and a server comprising a computing device coupled to a network and including at least one processor executing instructions within a memory. In Step 500, the database stores: an electronic textbook data, including a glossary associated with the electronic textbook data; a plurality of problems extracted from the electronic textbook data, and a plurality of knowledge graph data.

In Step 510, the server identifies, within the electronic textbook data, a guided solution to a problem in the plurality of problems; then identifies within the guided solution to the problem, a keyword. In Step 520, responsive to a determination that the keyword matches an entry in the glossary, the server automatically generates a tag associated with, and defining a skill associated with, the problem.

In Step 530, the server automatically generates a second tag associated with, and defining a second skill associated with a second problem in the plurality of problems; and, in Step 540, the server automatically generates a knowledge graph defining a relationship between the first skill and the second skill, wherein the first skill is a prerequisite to the second skill, and must be correctly completed prior to an availability of the second skill.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system comprising:
a database storing:
an electronic textbook data, including a glossary associated with the electronic textbook data; and
a plurality of problems extracted from the electronic textbook data;
a server comprising a computing device coupled to a network and including at least one processor executing instructions within a memory which, when executed, cause the system to:
identify:
within the electronic textbook data, a guided solution to a problem in the plurality of problems;
within the guided solution to the problem, a keyword;
responsive to a determination that the keyword matches an entry in the glossary, automatically generate a tag associated with, and defining a skill associated with, the problem;
automatically generate:
an assessment comprising an assessment problem, selected from the plurality of problems and associated with the skill, wherein, responsive to receiving an incorrect response to the assessment problem:
the database is updated to associate a user identification, associated in the database with a user that input the incorrect response, and the skill; and
no subsequent problems tagged with the skill are selected from the plurality of problems for the assessment; and
a customized exercise assignment, comprising an exercise problem selected from the plurality of problems and associated in the database with the skill.

2. The system of claim 1, wherein the instructions, when executed, further cause the system to receive, from a system administrator client device, the plurality of electronic textbook data, wherein the electronic textbook data is input by:
receiving a plurality of user input comprising the electronic textbook data; or
receiving the electronic textbook data from a scan of a physical textbook.

3. The system of claim 1, wherein the instructions, when executed, further cause the system to extract the plurality of problems from the electronic textbook data by:
identifying, within the electronic textbook data, a second problem;
responsive to a determination that the second problem is associated with a second guided solution:
identify a plurality of steps in the second guided solution; and
store the plurality of steps in the database in association with the second problem; and
responsive to a determination that the second problem is not associated with the second guided solution, store the second problem in the database.

4. The system of claim 1, wherein the instructions, when executed, further cause the system to:
store, within the database, a plurality of knowledge graph data;
automatically generate:
a second tag associated with, and defining a second skill associated with a second problem in the plurality of problems; and
a knowledge graph defining a relationship between the first skill and the second skill, wherein the first skill is a prerequisite to the second skill, and must be correctly completed prior to an availability of the second skill.

5. The system of claim 4, wherein the instructions, when executed, further cause the system to:
identify:
within the guided solution, a plurality of steps;
for each of the plurality of steps, at least one skill associated with a step; and
define, within the knowledge graph, a first step in the plurality of steps as a prerequisite to a second step in the plurality of steps.

6. The system of claim 4, wherein the instructions, when executed, further cause the system to:
identify a math equation problem, in the plurality of problems, associated with at least one mathematical equation skill tag;
interpret the math equation problem in a binary equation tree structure indicating a plurality of math operations and an order in which the plurality of math operations are carried out;
automatically generate a knowledge graph, wherein a first math operation that occurs earlier in the order in the plurality of math operations is a prerequisite to a second math operation that occurs later in the order in the plurality of math operations.

7. The system of claim 4, wherein the instructions, when executed, further cause the system to:

identify, within the glossary or an index for the electronic textbook data, a first page number associated with the problem tagged with the skill, and a second page number associated with a second problem associated with a second skill; and generate the knowledge graph wherein the first problem is a prerequisite to the second problem.

8. The system of claim 4, wherein the server is further configured to:
  generate, within the database, a history of user traversal of a plurality of steps for the assessment or the exercise;
  analyze an order of the plurality of steps taken, and at least one skill associated with each step in the plurality of steps;
  automatically generate the knowledge graph, wherein a first skill associated with a first step, taken by at least one user in the history of user traversal, is a prerequisite to a second skill, associated with a second step, taken by the at least one user.

9. The system of claim 4 wherein, responsive to receiving a correct response to the assessment problem, the instructions, when executed, further cause the system to identify, according to the knowledge graph, a selection of a subsequent problem in the plurality of problems, to transmit to the client device.

10. The system of claim 1, wherein the instructions, when executed, further cause the system to:
  automatically generate a plurality of tags to be associated with the problem;
  identify, within the plurality of tags, a first tag sharing a plurality of letters with a second tag; and
  remove the second tag from the plurality of tags.

11. A method comprising:
  storing, by a server comprising a computing device coupled to a network and comprising at least one processor executing instructions within a memory, within a database:
    an electronic textbook data, including a glossary associated with the electronic textbook data; and
    a plurality of problems extracted from the electronic textbook data;
  identifying, by the server:
    within the electronic textbook data, a guided solution to a problem in the plurality of problems;
    within the guided solution to the problem, a keyword;
  responsive to a determination that the keyword matches an entry in the glossary, automatically generating, by the server, a tag associated with, and defining a skill associated with, the problem;
  automatically generating, by the server:
    an assessment comprising an assessment problem, selected from the plurality of problems and associated with the skill, wherein, responsive to receiving an incorrect response to the assessment problem:
      the database is updated to associate a user identification, associated in the database with a user that input the incorrect response, and the skill; and
      no subsequent problems tagged with the skill are selected from the plurality of problems for the assessment; and
    a customized exercise assignment, comprising an exercise problem selected from the plurality of problems and associated in the database with the skill.

12. The method of claim 11, further comprising the steps of:
  storing, by the server, within the database, a plurality of knowledge graph data;
  automatically generating, by the server:
    a second tag associated with, and defining a second skill associated with a second problem in the plurality of problems; and
    a knowledge graph defining a relationship between the first skill and the second skill, wherein the first skill is a prerequisite to the second skill, and must be correctly completed prior to an availability of the second skill.

13. The method of claim 12 further comprising the steps of, responsive to receiving a correct response to the assessment problem, identifying, by the server, according to the knowledge graph, a selection of a subsequent problem in the plurality of problems, to transmit to the client device.

14. The method of claim 11, further comprising the steps of:
  automatically generating, by the server, a plurality of tags to be associated with the problem;
  identifying, by the server, within the plurality of tags, a first tag sharing a plurality of letters with a second tag; and
  removing, by the server, the second tag from the plurality of tags.

15. A system comprising a server, comprising a computing device coupled to a network and including at least one processor executing instructions within memory, the server being configured to:
  store, within a database:
    an electronic textbook data, including a glossary associated with the electronic textbook data;
    a plurality of problems extracted from the electronic textbook data; and
    a plurality of knowledge graph data;
  identify:
    within the electronic textbook data, a guided solution to a first problem in the plurality of problems;
    within the guided solution to the first problem, at least one keyword;
  responsive to a determination that the keyword matches an entry in the glossary, automatically generate a first tag associated with, and defining, a first skill associated with, the first problem;
  automatically generate:
    a second tag associated with, and defining a second skill associated with a second problem in the plurality of problems; and
    a knowledge graph defining a relationship between the first skill and the second skill, wherein the first skill is a prerequisite to the second skill, and must be correctly completed prior to an availability of the second skill.

16. The system of claim 15, wherein the server is further configured to automatically generate:
  an assessment comprising an assessment problem, selected from the plurality of problems and associated with the first skill, wherein, responsive to receiving an incorrect response to the assessment problem:
    the database is updated to associate a user identification, associated in the database with a user that input the incorrect response, and the first skill; and
    no subsequent problems tagged with the first skill are selected from the plurality of problems for the assessment; and
  a customized exercise assignment, comprising an exercise problem selected from the plurality of problems and associated in the database with the first skill.

17. The system of claim 15, wherein the server is further configured to:
identify:
within the guided solution, a plurality of steps;
for each of the plurality of steps, at least one skill associated with a step; and
define, within the knowledge graph, a first step in the plurality of steps as a prerequisite to a second step in the plurality of steps.

18. The system of claim 15, wherein the server is further configured to:
identify a math equation problem, in the plurality of problems, associated with at least one mathematical equation skill tag;
interpret the math equation problem in a binary equation tree structure indicating a plurality of math operations and an order in which the plurality of math operations are carried out;
automatically generate a knowledge graph, wherein a first math operation that occurs earlier in the order in the plurality of math operations is a prerequisite to a second math operation that occurs later in the order in the plurality of math operations.

19. The system of claim 15, wherein the server is further configured to:
identify, within the glossary or an index for the electronic textbook data, a first page number associated with the first problem tagged with the first skill, and a second page number associated with the second problem associated with the second skill; and
generate the knowledge graph wherein the first problem is a prerequisite to the second problem.

20. The system of claim 15, wherein the server is further configured to:
generate, within the database, a history of user traversal of a plurality of steps for an assessment or an exercise;
analyze an order of the plurality of steps taken, and at least one skill associated with each step in the plurality of steps;
automatically generate the knowledge graph, wherein a first skill associated with a first step, taken by at least one user in the history of user traversal, is a prerequisite to a second skill, associated with a second step, taken by the at least one user.

* * * * *